(12) United States Patent
Chiles et al.

(10) Patent No.: US 9,520,740 B2
(45) Date of Patent: Dec. 13, 2016

(54) WIRELESS CHARGER HAVING E-FIELD SHIELD

(71) Applicant: VISTEON GLOBAL TECHNOLOGIES, INC., Van Buren Township, MI (US)

(72) Inventors: Karen Lee Chiles, Farmington, MI (US); John Robert Balint, III, Saline, MI (US); Kevin Grady, Canton, MI (US); Oola Greenwald, Mevaseret Zion (IL); Gary O'Brien, Riverview, MI (US)

(73) Assignees: VISTEON GLOBAL TECHNOLOGIES, INC., Van Buren Township, MI (US); POWERMAT TECHNOLOGIES LTD., Neve Ilan (IL)

( * ) Notice: Subject to any disclaimer, the term of this patent is extended or adjusted under 35 U.S.C. 154(b) by 0 days.

(21) Appl. No.: 14/845,254

(22) Filed: Sep. 3, 2015

(65) Prior Publication Data

US 2015/0380980 A1   Dec. 31, 2015

Related U.S. Application Data

(62) Division of application No. 13/613,282, filed on Sep. 13, 2012, now Pat. No. 9,161,481.

(51) Int. Cl.
| | |
|---|---|
| *H02J 7/00* | (2006.01) |
| *H02J 7/02* | (2016.01) |
| *H05K 9/00* | (2006.01) |
| *H01F 27/36* | (2006.01) |
| *H01F 38/14* | (2006.01) |
| *H02J 7/04* | (2006.01) |

(52) U.S. Cl.
CPC ............ *H02J 7/025* (2013.01); *H01F 27/362* (2013.01); *H01F 38/14* (2013.01); *H02J 7/00* (2013.01); *H02J 7/04* (2013.01); *H05K 9/00* (2013.01)

(58) Field of Classification Search
CPC ................................. H02J 5/005; H02J 7/025
USPC ......................................... 320/107–108, 114
See application file for complete search history.

(56) References Cited

U.S. PATENT DOCUMENTS

| | | |
|---|---|---|
| 6,483,714 B1 | 11/2002 | Kabumoto et al. |
| 2010/0037072 A1 | 2/2010 | Nejah |
| 2010/0141839 A1 | 6/2010 | Supran et al. |
| | (Continued) | |

*Primary Examiner* — Paul Dinh
(74) *Attorney, Agent, or Firm* — Klintworth & Rozenblat IP LLC

(57) ABSTRACT

A shielding arrangement for preventing AM radio interference when a wireless charger is used in a vehicle has a plurality of parallel conductors arranged at a distance from one another responsive to a frequency desired to be attenuated. An interconnection arrangement includes a solid conductive junction and connects the conductors to one another without forming loops, and to ground. The conductors are traces disposed on a PCB. Additional parallel conducts are disposed on the other side of the PCB at an orthogonal orientation with respect to the first conductors. The spacing between the conductors is determined in response to the frequency desired to be attenuated, as well as frequencies thereabove that are desired to be propagated therethrough, such as mobile telephone signals. The solid conductive junction that is disposed on the printed circuit board is electrically and thermally conductive, such as copper.

6 Claims, 7 Drawing Sheets

(56) References Cited

U.S. PATENT DOCUMENTS

| | | |
|---|---|---|
| 2010/0172168 A1 | 7/2010 | Fells |
| 2011/0018498 A1 | 1/2011 | Soar |
| 2011/0164471 A1 | 7/2011 | Baarman et al. |
| 2011/0199045 A1 | 8/2011 | Hui et al. |
| 2013/0038279 A1* | 2/2013 | Seyerle ............... B60R 16/033 320/108 |
| 2013/0133937 A1 | 5/2013 | Choi |
| 2013/0181535 A1* | 7/2013 | Muratov ............... H01F 38/14 307/104 |

* cited by examiner

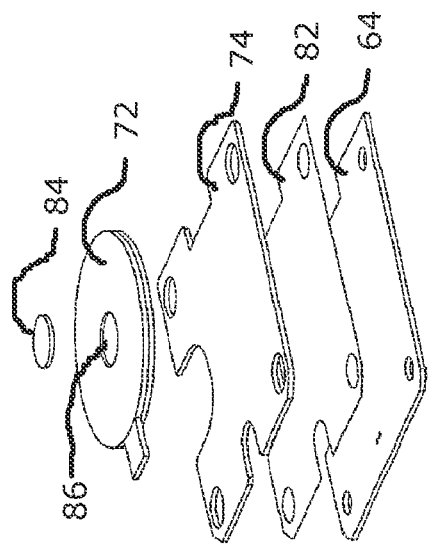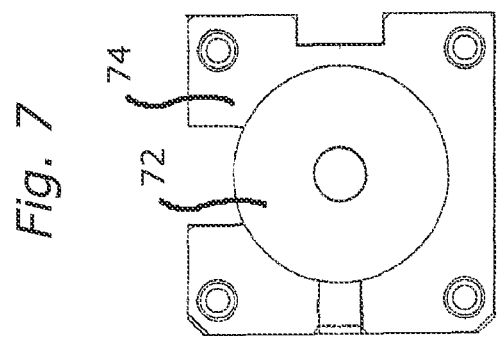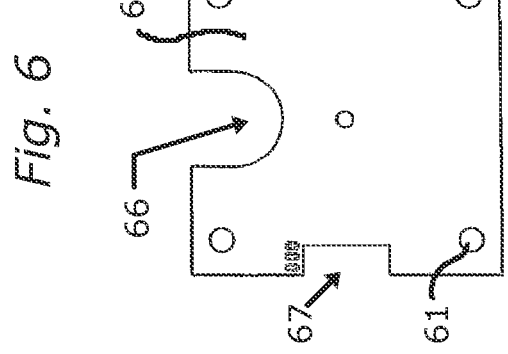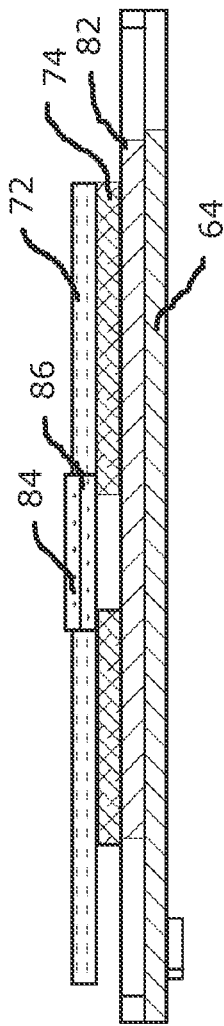

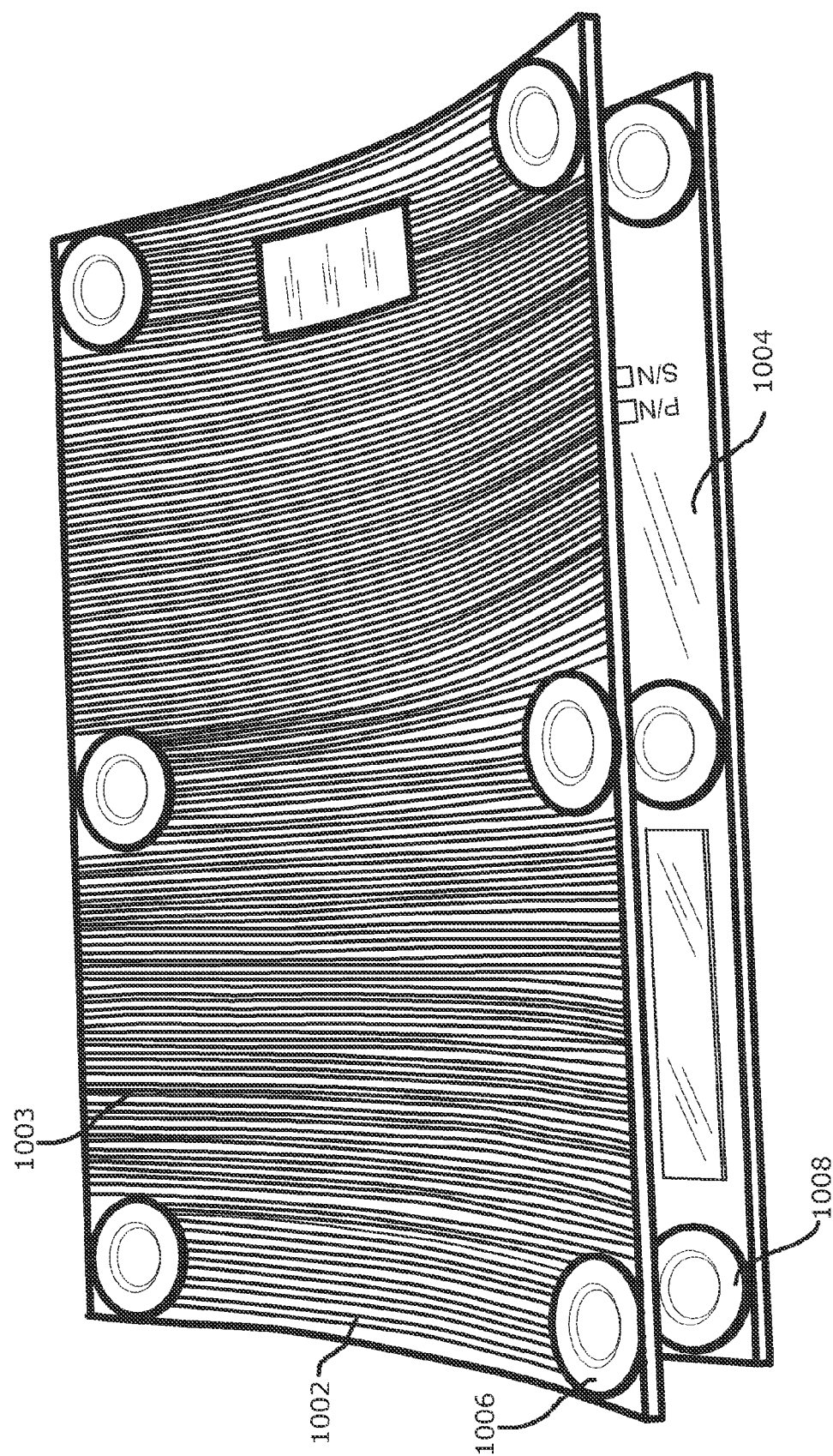

WIRELESS CHARGER HAVING E-FIELD SHIELD

This application is a divisional application of co-pending U.S. application Ser. No. 13/613,282, filed Sep. 13, 2012, of which this application is incorporated by reference herein in its entirety.

BACKGROUND OF THE INVENTION

1. Field of the Invention

This invention relates generally to electrical power systems that produce undesired electromagnetic fields and heat, and more particularly, to a shielding arrangement that is particularly useful in charging systems for chargeable devices, wherein the propagation of electromagnetic fields and heat is attenuated, but magnetic fields are permitted to pass with minimal eddy current losses. This invention relates generally to electrical power systems that produce undesired electromagnetic fields and heat, and more particularly, to a shielding arrangement that is particularly useful in charging systems for chargeable devices, wherein the propagation of electromagnetic fields and heat is attenuated, but magnetic fields are permitted to pass with minimal eddy current losses.

2. Description of the Related Art

Wireless charging systems transfer energy between a primary and secondary coil by creating a time variant magnetic field in the primary coil. This magnetic field also creates a similar time variant electric field or E-field. The fundamental frequency of this primary signal can be designed to lie below the AM radio band in an attempt to avoid interfering with the AM radio reception in a vehicle application.

However, it is expensive, and inefficient from the standpoint of power utilization, to eliminate the harmonics of the primary signal that spill over into the AM band and interfere with AM radio reception. There is therefore a need in the art to reduce AM band interference cause by wireless charging systems.

The prior art has sought to address issues related to magnetic interference by providing magnetic shielding around the outer volume of the primary secondary system. However, the prior art does not seem to address the particular concerns of an automotive application of wireless charging and its interference with the AM radio reception.

Another problem inherent in wireless charging is the temperature rise of the charger surface that contacts the chargeable device. Excessive temperature rise of this surface will cause the chargeable device to terminate charging in order to protect itself from overheating. The difficulty in removing the waste heat from the charging coil is that there can be no conductive loop established above the coil because of eddy current formation. Therefore, a solid electrically conductive material cannot be placed above the coil to function as a heat sink.

There is therefore in the art a need for a wireless charging arrangement that, in addition to reducing, and preferably eliminating, AM band interference, the wireless charging arrangement does not cause the charger surface to generate excessive heat.

It is, therefore, an object of this invention to provide a wireless charging arrangement for a handheld device that does not cause undue heat to be transferred to the handheld device.

It is another object of this invention to provide a system for attenuating electromagnetic energy stemming from an electrical apparatus that would cause interference in a frequency range of interest to transmission of information.

It is also an object of this invention to provide a system for attenuating electromagnetic energy that would interfere with radio transmission signals.

It is a further object of this invention to provide a system for attenuating electromagnetic energy that would interfere with radio transmission signals of a predetermined frequency range, but would permit radio signals of a different frequency range to pass through substantially without being attenuated.

SUMMARY OF THE INVENTION

The foregoing and other objects are achieved by this invention which provides, in accordance with a first apparatus aspect thereof, a shielding arrangement having a plurality of substantially parallel conductors arranged at a first predetermined lateral distance from one another. The first predetermined lateral distance is responsive to a frequency of an electromagnetic energy that is desired to be attenuated as the electromagnetic energy is propagated through the shielding arrangement. There is additionally provided an interconnection arrangement for connecting the plurality of substantially parallel conductors to one another.

In one embodiment of this first apparatus aspect of the invention, there is further provided a printed circuit board, and the plurality of substantially parallel conductors constitute conductive traces that are disposed on a first side of the printed circuit board.

In a further embodiment, the interconnection arrangement includes a solid conductive junction disposed on the printed circuit board.

In a still further embodiment of the invention, the printed circuit board has a second side, and there is provided a further plurality of substantially parallel conductors arranged at a second predetermined lateral distance from one another. The further plurality of substantially parallel conductors have a predetermined angular orientation with respect to the plurality of substantially parallel conductors. In some embodiments, the predetermined angular orientation is a substantially orthogonal angular orientation.

The first and second predetermined lateral distances are equal to each other in some embodiments of the invention. Also, there is provided in some embodiments a further interconnection arrangement for connecting the further plurality of substantially parallel conductors to one another. In an advantageous embodiment, the further interconnection arrangement is the previously described solid conductive junction that is disposed on the printed circuit board.

In a further advantageous embodiment of the invention, the solid conductive junction disposed on the printed circuit board is configured to conduct heat. Therefore, it is advantageous that the solid conductive junction that is disposed on the printed circuit board be formed of a material that is electrically and thermally conductive. An excellent material for this purpose is a metallic material that contains copper.

In accordance with a further apparatus aspect of the invention, there is provided a wireless charging arrangement for a handheld device. In accordance with this further aspect of the invention, the wireless charging arrangement is provided with a primary charging coil that has an electrical input for receiving input electrical pulses. The input electrical pulses urge the primary charging coil to issue a time-varying magnetic field and a time-varying electric field. Both such fields are responsive to the input electrical pulses. There is additionally provided an E-field shield that attenuates the time-varying electric field.

In one embodiment of this further apparatus aspect of the invention, the time-varying electric field contains a frequency component that would cause interference in the AM radio transmission band. Thus, the E-field shield is configured to attenuate the interfering frequency component of the time-varying electric field.

In an advantageous embodiment of this further apparatus aspect, the E-field shield is configured to prevent the creation of eddy currents in the time-varying magnetic field.

In a further advantageous embodiment of this aspect of the invention, the E-field shield is configured to permit propagation therethrough of electromagnetic signals having frequencies above those of the AM radio transmission band. This characteristic of the E-field shield is particularly useful in embodiments of the invention where the E-field shield is arranged to surround around the wireless charging arrangement. In other embodiments, however, the E-field shield is interposed between the primary charging coil and the handheld device.

In accordance with a method aspect of the invention, there is provided a method of reducing AM radio interference when using a wireless charging arrangement to charge an internal battery of handheld device. The method includes the step of interposing an E-field shield between the wireless charging arrangement and an affected AM radio receiver.

In one embodiment of this method aspect, the step of interposing an E-field shield between the wireless charging arrangement and an affected AM radio receiver includes the step of interposing a first plurality of substantially parallel conductors arranged at a first predetermined lateral distance from one another, the first predetermined lateral distance being responsive to a frequency of an electromagnetic energy that is desired to be attenuated as the electromagnetic energy is propagated through the shielding arrangement.

In a further embodiment, the step of interposing an E-field shield between the wireless charging arrangement and an affected AM radio receiver includes the step of interposing between the wireless charging arrangement and an affected AM radio receiver a further plurality of substantially parallel conductors arranged at the first predetermined lateral distance from one another, the further plurality of substantially parallel conductors having a predetermined angular orientation with respect to the first plurality of substantially parallel conductors.

As noted, the proposed solution to the AM interference problem in accordance with one embodiment of the present invention is the addition of an E-field shield disposed above the primary coil such that it attenuates the AM band field but allows the magnetic field to pass through with no significant eddy current losses in the shield layer. Eddy currents reduce efficiency in a wireless charger embodiment. Preferably, the shield is made of thermally conductive material thereby affording the added benefit of dissipating heat away from the coil area. In areas surrounding, but not directly over, the coil, this shield in some embodiments of the invention is solid, thereby improving its heat sinking ability.

In other embodiments, an E-field shield is arranged around a portion of the charger system including the primary and the secondary elements. This may take the form in some embodiments of a complete six-sided enclosure, or it may simply be a single plane of shielding interposed between the charging system and the AM antenna of an affected AM radio receiver.

The solution proposed in accordance with the present invention is cost effective since the shield can be integrated into the printed wiring board (PWB) based primary coil top layer, or it could be added as a secondary PWB placed on top of the primary coil. A similar shielding concept can in some embodiments be applied to wire wound primary coils, but the overall cost and structural advantage is not as pronounced compared to the PWB based primary coil implementation.

Some of the key characteristics of the inventive E-field shield are:

1) The thickness of the shield should be as small as possible so that it does not significantly increase the nominal gap between the primary and secondary coil. A larger nominal gap reduces the useful range of the air gap in the application of a wireless charger;

2) There must be no closed loops in the conductive pattern of the E-field shield because closed loops support eddy currents that produce charging inefficiency and create unwanted temperature rise in the charger housing;

3) The width of the conductors in the E-field shield pattern should be narrow enough to reduce eddy currents in the individual traces;

4) The spacing of the E-field shield traces should be close enough to shield AM signals but in the case of the full system shield should be far enough apart to allow mobile phone signals to pass;

5) The shield traces should be electrically conductive, but magnetically neutral; and 6) The shield traces should be connected to the negative voltage reference of the vehicle.

In some embodiments of the invention, the E-field shield assists in the dissipation of the charger coil waste heat by providing a solid copper pattern in areas of the shield that are not directly above the coil. The effectiveness of the E-field shield pattern is enhanced if the E-field shield is made of a material that is highly electrically conductive. Moreover, significant advantages are achieved if the material is highly thermally conductive for enhancing the heat sink function. Copper is an excellent material for both parameters, as it is an excellent electrical and thermal conductor. The same vias that are used to ground the shield conductor can also serve as thermal vias to the grounded aluminum heat sink in the charger that is also at ground potential.

In a specific illustrative embodiment of the invention, the distance between the adjacent conductors of the shielding mat is spaced less than the ¼ wavelength of the frequencies that are desired to be attenuated. Thus, the spacing of the E-field shield traces are close enough to shield AM signals, and in embodiments of the invention that employ a full system shield, the conductive traces are far enough apart to permit the passage there through of mobile phone signals. In such embodiments, it is desired to attenuate the radiation in the AM band, illustratively ~150 kHz to ~1.71 MHz. Measurements using a rod antenna illustrate the effectiveness of the attenuation achieved with the present inventive shield system.

BRIEF DESCRIPTION OF THE DRAWINGS

Comprehension of the invention is facilitated by reading the following detailed description, in conjunction with the annexed drawing, in which:

FIG. 6 is a simplified schematic representation of a circuit board that is useful in a single mat module of a wireless charger arrangement that employs the E-field shield of the present invention;

FIG. 7 is a simplified schematic representation of a heat sink and primary coil arrangement that is useful in a single mat module of a wireless charger arrangement that employs the E-field shield of the present invention;

FIG. 8 is a partially exploded representation that illustrates an arrangement of a printed circuit board, a Nomex® layer, a heat sink layer, a coil layer, and two magnets for forming a wireless charger arrangement;

FIG. 9 is a simplified cross-sectional representation of the arrangement of FIG. 8;

FIG. 10 is a simplified schematic isometric representation of an E-field shield constructed in accordance with the invention overlying a printed circuit board.

DETAILED DESCRIPTION

Figure 1:
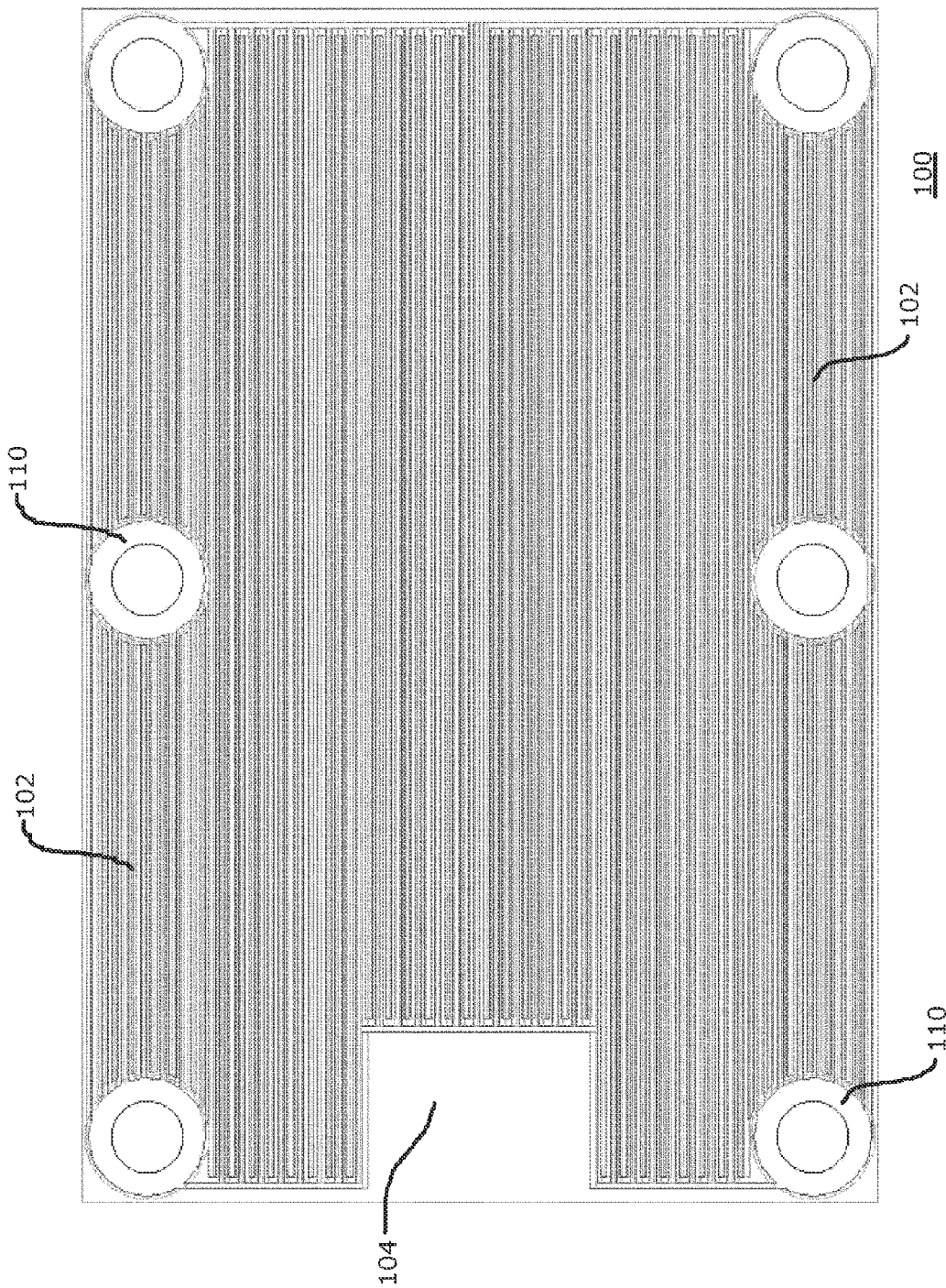
FIG. 1 is a plan representation of one side of an E-field shield constructed in accordance with the principles of the invention depicting plural electrically conductive traces arranged longitudinally.

FIG. 1 is a plan representation of one side of an E-field shield 100 constructed in accordance with the principles of the invention, and depicts plural electrically conductive traces 102 arranged longitudinally on a circuit board 104. In this specific illustrative embodiment of the invention, circuit board 104 is configured for use with a wireless charger (not shown) for a handheld device (not shown). Electrically conductive traces 102 are electrically coupled to one another at solid patterns 110, and do not form, in this embodiment, any closed loops. The solid patterns, in this embodiment, are formed of copper and are arranged so as not to be located in the region (not specifically designated) of circuit board 104 that would be near the charging coil (not shown in this figure) of the wireless charger.

Electrically conductive traces 102 are separated from one another by a distance that is, in some embodiments, responsive to the frequency of the electrical energy that is desired to be attenuated. In the present embodiment, it is desired to attenuate electromagnetic energy that would interfere with the AM radio band, as would be the case with a wireless charger arrangement intended for use in a vehicle. As noted above, it is in this illustrative embodiment of the invention desired to attenuate the propagation of electromagnetic radiation in the AM band, illustratively ~150 kHz to ~1.71 MHz. The inter-trace spacing therefore must be smaller than the quarter wavelength of the highest frequency desired to be attenuated. However, in embodiments of the invention where the handheld device (not shown) that is desired to be charged is a mobile telephone, the inter-trace spacing must be large enough to permit mobile telephone signals to pass through the E-field shield, in embodiments where the mobile telephone it disposed within the shielded region, as will be discussed below.

Figure 2:
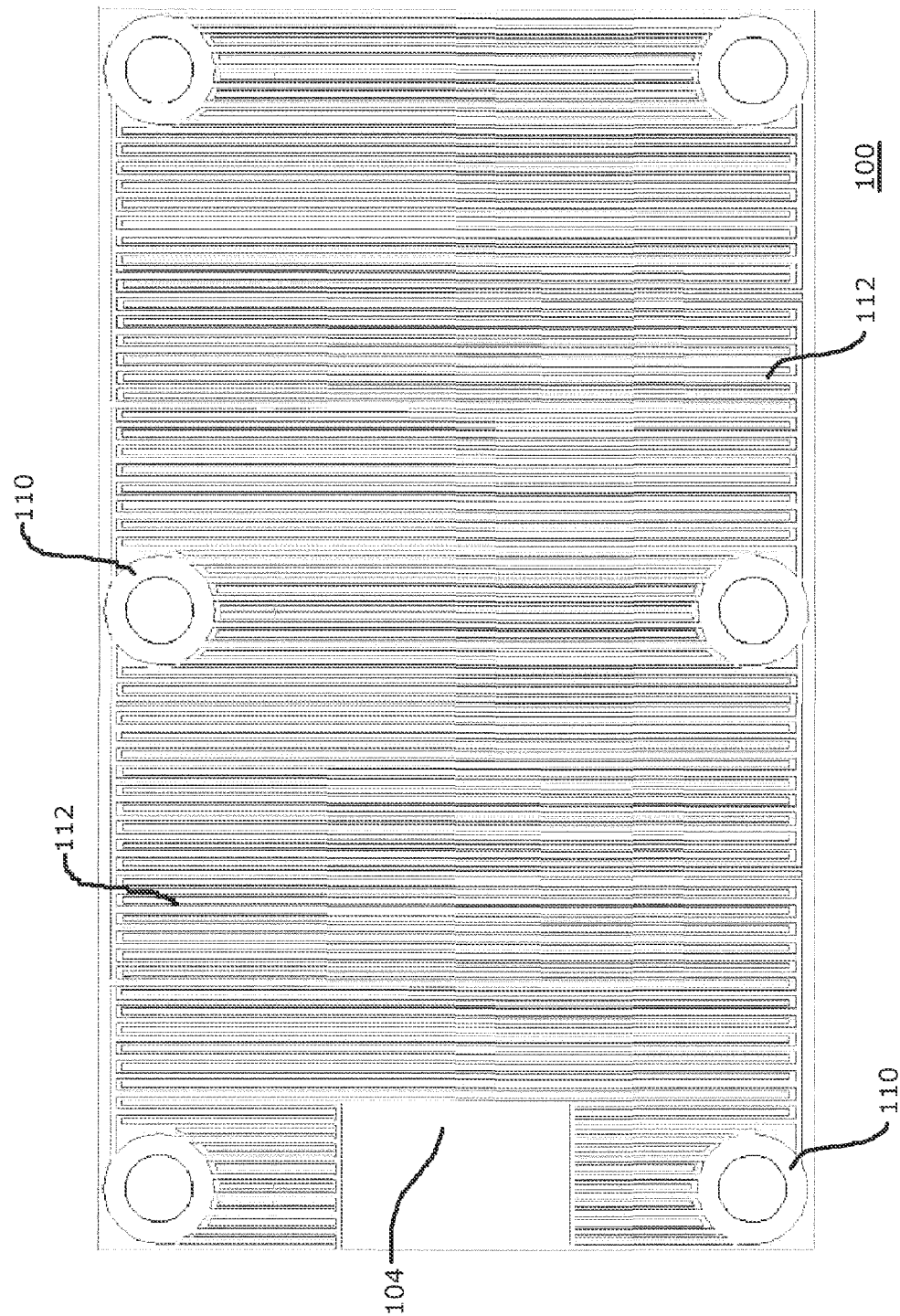
FIG. 2 is a plan representation of the other side of the E-field shield of FIG. 1 depicting plural electrically conductive traces arranged substantially orthogonally relative to the electrically conductive traces on the side shown in FIG. 1.

FIG. 2 is a plan representation of the other side of E-field shield 100, shown in FIG. 1, depicting plural electrically conductive traces 112 arranged substantially orthogonally relative to the electrically conductive traces on the side shown in FIG. 1, on circuit board 104. Elements of structure that have previously been discussed are similarly designated. In FIGS. 1 and 2, solid patterns 110 serve as grounding points, as it is desirable that the conductive traces be at ground potential. Also in this embodiment, solid patterns 110 serve to conduct heat away from the region where the handheld device to be charged is disposed, as will be described hereinbelow.

Figure 3:
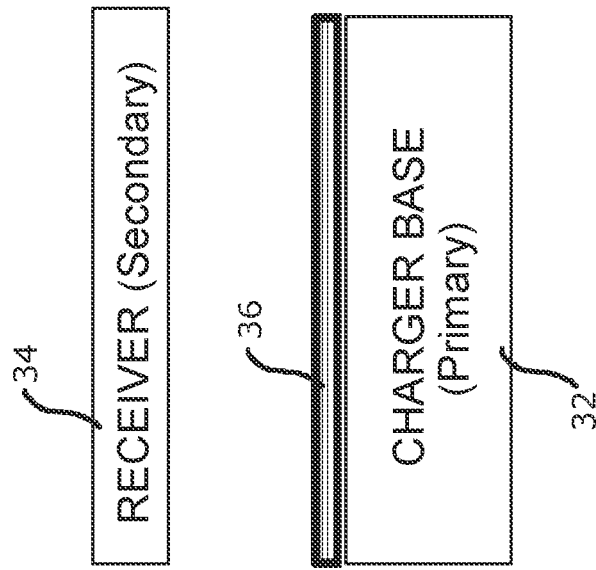
FIG. 3 is a simplified schematic representation of a wireless charger arrangement in which an E-field shield constructed in accordance with the principles of invention is interposed between the charger base and the receiver.

FIG. 3 is a simplified schematic representation of a wireless charger arrangement in which an E-field shield 36, constructed in accordance with the principles of invention, is interposed between a charger base 32 and a receiver 34.

Figure 4:
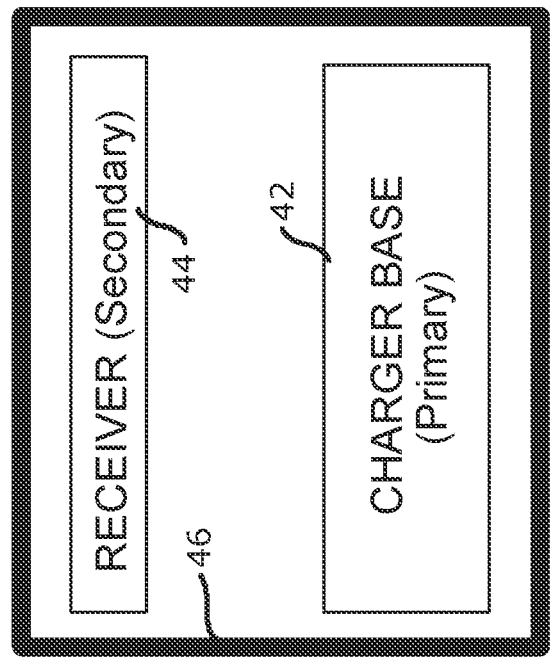
FIG. 4 is a simplified schematic representation of a wireless charger arrangement in which an E-field shield constructed in accordance with the principles of invention is arranged to surround the charger base and the receiver.

FIG. 4 is a simplified schematic representation of a wireless charger arrangement in which an E-field shield 46 constructed in accordance with the principles of invention is arranged to surround a charger base 42 and a receiver 44. In this embodiment, The handheld device (not shown) desired to be charged (not specifically designated) encloses receiver 44 and is enclosed within the E-field shield, and therefore the inter-trace (or inter-conductor) spacing of the E-field shield must be large enough to enable mobile telephone signals to pass there through. Persons of skill in the art can configure the inter-trace spacing small enough to block transmission of electromagnetic radiation that would interfere with the conventional AM band, yet be large enough to enable the significantly higher frequencies of mobile telephone communication signals to pass through. Thus, when used in a vehicle, AM radio band interference is attenuated, but the mobile telephone remains active and usable to receive telephone calls.

Figure 5:
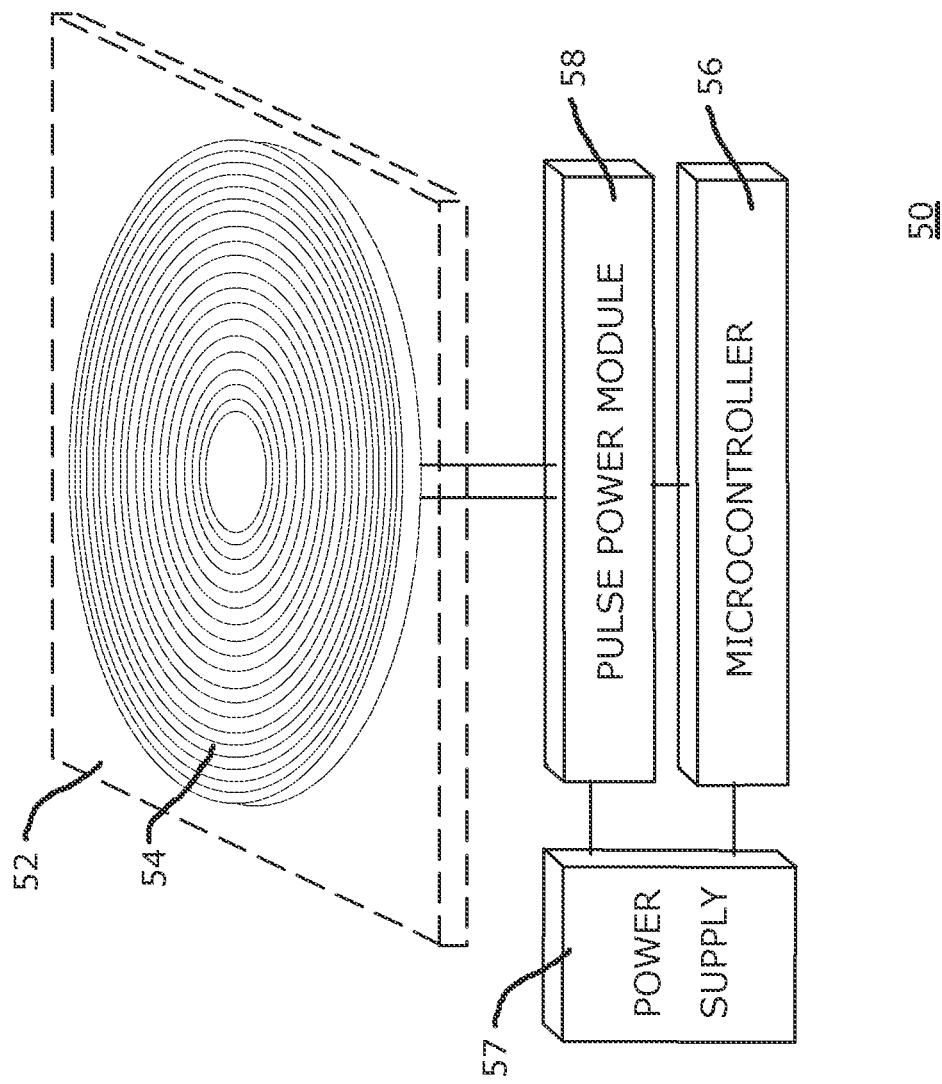
FIG. 5 is a highly simplified block and line representation of a specific illustrative embodiment of the invention shown in the context of a wireless charger arrangement, the E-field shield of the present invention being applied to limit AM band interference from a planar charger coil.

FIG. 5 is a highly simplified block and line representation of a specific illustrative embodiment of the invention shown in the context of a wireless charger arrangement 50. In this embodiment, E-field shield 52 of the present invention (shown simplified and in phantom) is applied to attenuate the propagation of AM band interference signals (not shown) that originate from a primary charging coil 54 (represented schematically). The E-field shield is shown in this figure to overlie the primary charging coil, which in some embodiments is formed by printing corresponding conductive traces onto a printed wiring board (not shown in this figure).

As shown in this figure, a micro controller 56 receives operating power from a power supply 57 that also supplies electrical energy to a pulse power module 58. The micro controller manages delivery of system power pulses (not shown) to the primary charging coil via the pulse power module. The electrical pulses issued by pulse power module 58 contain frequency components that are converted by primary charging coil 54 into emissions (not shown) that contain radio frequency components that interfere with AM radio transmissions. Thus, when such a wireless charger is employed in a vehicle (not shown) whereby the wireless charger is in proximity of an AM radio (not shown), it is necessary to suppress such interference signals. In this regard, it is noted that primary charging coil 54 issues a time-varying magnetic field and a time-varying electric field, neither of which is shown in the figure, that are responsive to the input electrical pulses. E-field shield 52, as described herein, attenuates the propagation of the interference signals while creating minimal if any eddy currents in, or attenuation of, the time varying magnetic field.

Although primary charging coil 54 and E-field shield 52 are shown in this specific illustrative embodiment of the invention to have substantially planar configurations, it is to be understood that other coil and shield configurations can be employed in the practice of the invention. As will be discussed below, the E-field shield can in some embodiments have a flexible characteristic allowing such shielding to be applied to attenuate determined frequency components of E-field emissions from non-planar coils. Also, as noted, the E-field shield can in other embodiments of the invention be configured to surround the entirety of the wireless charger unit, and in still further embodiments, surround the entire wireless charger unit and the handheld device being charged.

FIG. 6 is a simplified schematic representation of a circuit board 64 that is useful in a single mat module (not shown) of a wireless charger arrangement that employs the E-field shield (not shown in this figure) of the present invention. In this embodiment, circuit board 64 has a thickness of approximately 1.00 mm, and overall plan dimensions of approximately 51.5 mm (vertically in the drawing) and a width of approximately 52.50 mm. A semi-circular notch region 66 has a radius dimension of approximately 9.00 mm, and a rectangular notch 67 has a depth of approximately 6.5 mm and a dimension along the edge of circuit board 64 of approximately 16 mm. The four apertures 61 have a diameter of approximately 4.4 mm.

FIG. 7 is a simplified schematic representation of a heat sink arrangement 74 that is useful in a single mat module of a wireless charger arrangement that employs the E-field shield of the present invention. Heat sink arrangement 74 has disposed thereon a primary coil 72. In this embodiment, primary coil 72 is configured as a printed circuit board formed of commercially available ferrite and Nomex®.

FIG. 8 is a partially exploded representation that illustrates an arrangement of printed circuit board 64, a Nomex® layer 82, heat sink layer 74, coil layer 72, and two permanent magnets 84 and 86 for forming a wireless charger arrangement (not specifically designated). Elements of structure that have previously been discussed are similarly designated. As is seen from this figure, coil layer 72 and heat sink 74 are maintained separated from printed circuit board 64 by Nomex® layer 82.

FIG. 9 is a simplified cross-sectional representation of the arrangement of FIG. 8. Elements of structure that have previously been discussed are similarly designated. There is shown in this figure a stacked arrangement of printed circuit board 64, Nomex® layer 82, heat sink layer 74, coil layer 72, and permanent magnets 84 and 86. Permanent magnets 84 and 86 are useful to ensure that the handheld device (not shown) remains in position centered over primary coil 72.

FIG. 10 is a simplified schematic isometric representation of an E-field shield 1002 constructed in accordance with the invention overlying a printed circuit board 1004. As shown in this figure, E-field shield 1002 has a plurality of conductors 1003 that are spaced sufficiently close to attenuate electromagnetic energy that would cause interference with AM band radio signals. As previously described, the conductors are not looped, so as to prevent the formation of eddy currents and are coupled electrically to solid printed areas 1006. In some embodiments, such as where conductive traces are included on the unseen side of E-field shield 1002, those conductive traces are also connected to solid printed areas 1006.

It is seen from FIG. 10 that E-field shield 1002 is arranged to overlie a printed board 1004, that contains circuitry that, if not shielded, would issue electromagnetic radiation that would cause interference in the AM radio frequency band. In addition, E-field shield 1002 is shown to be somewhat flexible, and accordingly, the invention is not limited to inflexible substrates. Although not seen in this figure, in some embodiments of the invention that is provided a primary coil directly on printed circuit board 1004.

Figure 11A:
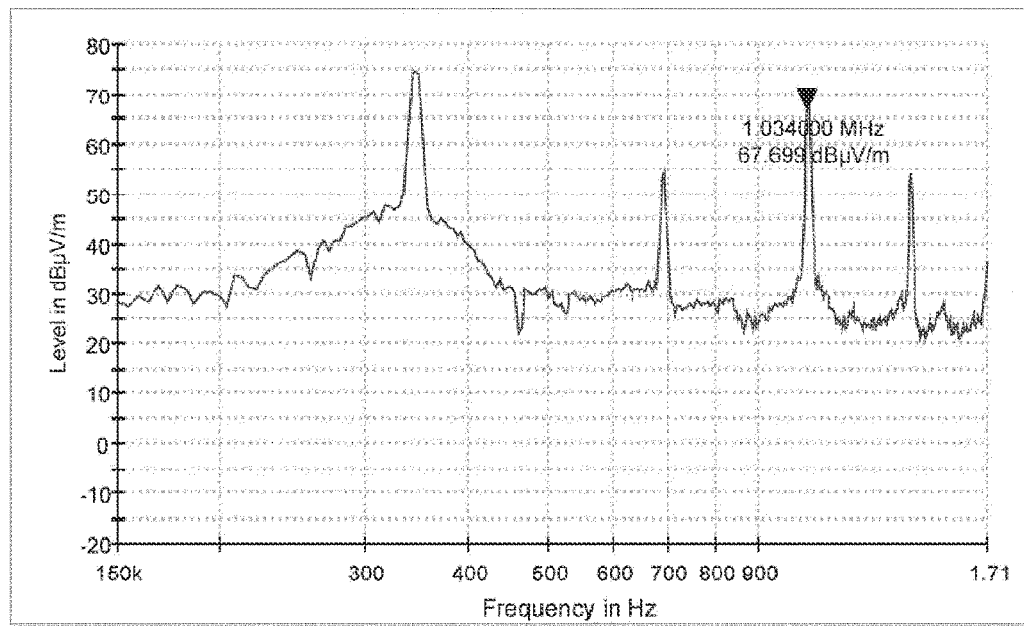
FIGS. 11(a) and 11(b) are graphical representations that illustrate the magnitude as a function of frequency distribution of AM interference from a wireless charging arrangement without E-field shielding, and the attenuation that is achieved with the E-field shielding of the present invention.
Figure 11B:
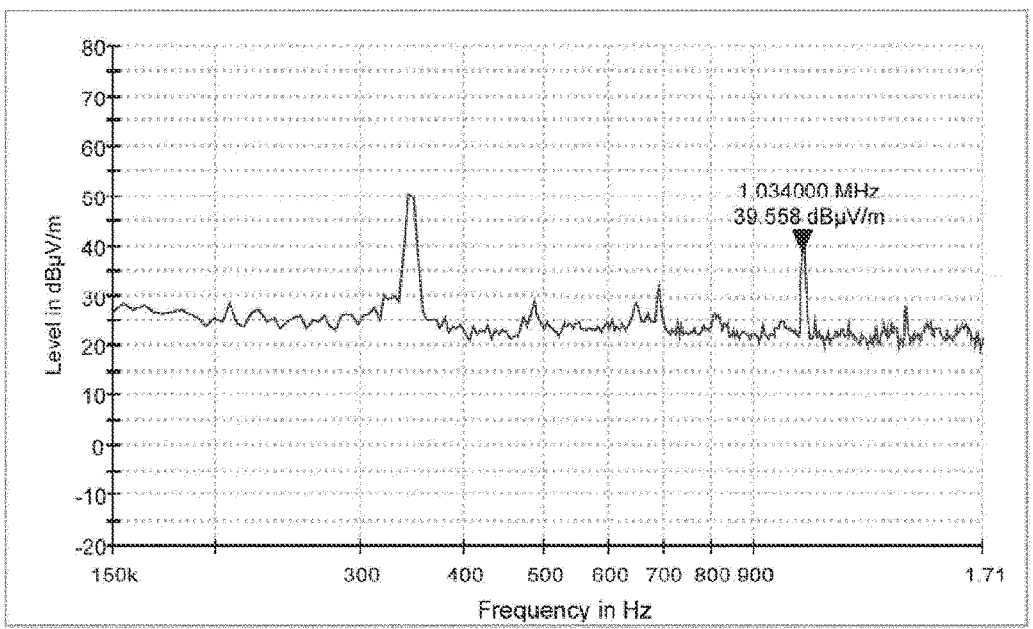

FIGS. 11(*a*) and 11(*b*) are graphical representations that illustrate the magnitude as a function of frequency distribution of AM interference signal issued from a wireless charging arrangement without E-field shielding, and the attenuation that is achieved with the E-field shielding of the present invention. As shown in FIG. 11(*a*), the signal trace that has been received by a test rod antenna (not shown) in a wireless charger arrangement that has not been shielded in accordance with the invention has a magnitude of 67.699 dBµV/m at 1.034000 MHZ. In contrast, FIG. 11(*b*) shows that with the use of the inventive shielding system, the signal trace at 1.034000 MHZ is only 39.558 dBµV/m. The present embodiment of the invention is therefore seen to be effective at attenuating the issued interference signal in the AM band.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

The invention claimed is:

1. A wireless charging arrangement for charging a handheld device, the wireless charging arrangement comprising:
   a primary charging coil having an electrical input for receiving input electrical pulses, the input electrical pulses causing the primary charging coil to radiate a time-varying magnetic field and a time-varying electric field, responsive to the input electrical pulses; and
   an E-field shield that attenuates the time-varying electric field, the E-field shield interposed between the primary charging coil and the handheld device, and including:
      a first plurality of substantially parallel conductors disposed on a first side of a printed circuit board;
      a second plurality of substantially parallel conductors disposed on a second side of the printed circuit board in a substantially orthogonal angular orientation relative to the first parallel conductors, the second side of the printed circuit board being coplanar with and opposite the first side of the printed circuit board.

2. The wireless charging arrangement of claim 1, wherein the time-varying electric field contains frequency components in the AM radio transmission band, and said E-field shield is configured to attenuate a component of the time-varying electric field that would create interference with electromagnetic signals in the AM radio transmission band.

3. The wireless charging arrangement of claim 2, wherein said E-field shield is configured to prevent the creation of eddy currents in the time-varying magnetic field.

4. The wireless charging arrangement of claim 2, wherein said E-field shield is configured to permit propagation therethrough of electromagnetic signals having frequencies above those of the AM radio transmission band.

5. The wireless charging arrangement of claim 4, wherein said E-field shield is arranged to surround around the wireless charging arrangement.

6. The wireless charging arrangement of claim 3, wherein said E-field shield is interposed between said primary charging coil and the handheld device.

* * * * *